United States Patent
Kim et al.

(10) Patent No.: US 12,470,099 B2
(45) Date of Patent: Nov. 11, 2025

(54) ROTOR ASSEMBLY WITH MAGNETS AND PLATE WITH A PROTRUSION IN CLOSE CONTACT WITH THE MAGNET AND WITH A RESIN PORTION

(71) Applicant: HYUNDAI MOBIS Co., Ltd., Seoul (KR)

(72) Inventors: Yong Ho Kim, Yongin-si (KR); Bit Na Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 401 days.

(21) Appl. No.: 17/879,025

(22) Filed: Aug. 2, 2022

(65) Prior Publication Data

US 2023/0034210 A1   Feb. 2, 2023

(30) Foreign Application Priority Data

Aug. 2, 2021   (KR) .................. 10-2021-0101558

(51) Int. Cl.
*H02K 1/27* (2022.01)
*H02K 1/278* (2022.01)
*H02K 1/28* (2006.01)
*H02K 15/12* (2006.01)

(52) U.S. Cl.
CPC ............... *H02K 1/278* (2013.01); *H02K 1/28* (2013.01); *H02K 15/12* (2013.01); *H02K 2213/03* (2013.01)

(58) Field of Classification Search
CPC .......... H02K 1/28; H02K 1/27; H02K 1/2773; H02K 1/278; H02K 1/2786; H02K 1/30; H02K 1/2706; H02K 1/02; H02K 1/16; H02K 1/24; H02K 1/2713; H02K 1/32; H02K 15/00; H02K 15/03; H02K 15/12; H02K 15/02; H02K 2213/03; H02K 9/06; H02K 11/215; H02K 11/0068; H02K 11/022; H02K 11/40; H02K 29/08; H02K 29/00; H02K 29/14
See application file for complete search history.

(56) References Cited

U.S. PATENT DOCUMENTS

| 7,479,723 | B2 * | 1/2009 | Dawsey | H02K 1/2766 |
| | | | | 310/91 |
| 10,020,701 | B2 * | 7/2018 | Kamiyoshihara | H02K 1/278 |
| 10,476,325 | B2 * | 11/2019 | Horng | H02K 1/2773 |

(Continued)

FOREIGN PATENT DOCUMENTS

| KR | 10-2019-0065525 A | 6/2019 |
| KR | 10-2020-0045961 A | 5/2020 |

OTHER PUBLICATIONS

Office Action dated Nov. 20, 2024, issued in corresponding Korean Patent Application No. 10-2021-0101558.

*Primary Examiner* — Maged M Almawri
(74) *Attorney, Agent, or Firm* — MORGAN, LEWIS & BOCKIUS LLP

(57) ABSTRACT

A rotor assembly includes: a shaft; a rotor core having a through-hole which is formed in an axial direction (A) and into which the shaft is inserted; a magnet inserted into an inner space of the rotor core; and a plate provided in close contact with one side of the rotor core in the axial direction (A). The plate includes a protrusion formed in a region, which faces a region between the magnet and the circumference of the rotor core, and protruding toward the rotor core.

7 Claims, 8 Drawing Sheets

(56) References Cited

U.S. PATENT DOCUMENTS

| | | | | |
|---|---|---|---|---|
| 10,903,702 | B2* | 1/2021 | Lee | H02K 15/12 |
| 2011/0254399 | A1* | 10/2011 | Blanc | H02K 1/2773 |
| | | | | 29/598 |
| 2013/0057103 | A1* | 3/2013 | Han | H02K 1/2773 |
| | | | | 310/156.12 |
| 2013/0187486 | A1* | 7/2013 | Lee | H02K 1/30 |
| | | | | 310/43 |
| 2013/0187506 | A1* | 7/2013 | Lee | H02K 1/28 |
| | | | | 310/156.12 |
| 2017/0110918 | A1* | 4/2017 | Horng | H02K 1/2706 |
| 2018/0198331 | A1* | 7/2018 | Sano | H02K 1/276 |
| 2019/0173341 | A1* | 6/2019 | Lee | H02K 15/03 |
| 2020/0127508 | A1* | 4/2020 | Dlala | H02K 1/276 |
| 2020/0161913 | A1* | 5/2020 | Nakahara | H02K 1/2773 |
| 2022/0247289 | A1* | 8/2022 | Yoshisako | H02K 15/03 |

* cited by examiner

ROTOR ASSEMBLY WITH MAGNETS AND PLATE WITH A PROTRUSION IN CLOSE CONTACT WITH THE MAGNET AND WITH A RESIN PORTION

CROSS-REFERENCE TO RELATED APPLICATION(S)

This application claims priority from and the benefit of Korean Patent Application No. 10-2021-0101558, filed on Aug. 2, 2021, which is hereby incorporated by reference for all purposes as if set forth herein.

TECHNICAL FIELD

Exemplary embodiments relate to a rotor assembly, a method for manufacturing the rotor assembly, and a motor including the rotor assembly.

BACKGROUND

For motors including rotors and stators, in order to ensure the safety of a rotor core provided in a rotor even in the high-speed range of a motor, it is necessary to secure rigidity even in a region of the rotor core to which stress is concentrated.

The region of the rotor core, to which the stress is concentrated, includes a section between a circumferential region of the rotor core and a region provided with the magnet, and is a region in which the thickness of the rotor core is relatively small (hereinafter, referred to as a 'small thickness region'). According to the related art, the durability of the rotor core against stress is improved by increasing the thickness of the small thickness region.

However, according to the related art, when the thickness of the small thickness region increases, the amount of magnetic flux that leaks during a process of driving a motor increases, and accordingly, the amount of effective magnetic flux decreases. This causes deterioration in torque and output of the motor.

SUMMARY

Exemplary embodiments of the present invention provide a motor and a rotor assembly, which have a new structure that can prevent deterioration in torque and output of the motor while resolving limitations caused by the concentration of stress in a specific region of the rotor core.

A first exemplary embodiment of the present invention provides a rotor assembly including: a shaft; a rotor core having a through-hole which is formed in an axial direction (A) and into which the shaft is inserted; a magnet inserted into an inner space of the rotor core; and a plate provided in close contact with at least one side of the rotor core in the axial direction (A), wherein the plate includes a protrusion formed in a region, which faces a region between the magnet and the circumference of the rotor core, and protruding toward the rotor core.

The protrusion may be provided in close contact with the magnet.

A certain region may be formed between the rotor core and the magnet, and the rotor assembly may further include a resin portion that is provided in the certain region and bonded to the rotor core and the magnet.

The protrusion may be provided in close contact with the resin portion.

The magnet may be provided inside the rotor core at a certain angle (θ) with respect to a radial direction (R) perpendicular to the axial direction (A), and the protrusion may be provided in close contact with one end of the magnet that is adjacent to the circumference of the rotor core.

The resin portion may include a first resin portion bonded to one end of the magnet that is adjacent to the circumference of the rotor core.

The resin portion may further include a second resin portion bonded to the other end of the magnet on the opposite side from the one end.

An empty space may be formed between the magnet and the rotor core at the other end of the magnet on the opposite side from the one end.

The magnet may include: a first magnet provided at the certain angle (θ) with respect to the radial direction (R); and a second magnet located parallel to the first magnet and provided further inside the rotor core than the first magnet, wherein the protrusion includes: a first protrusion provided in close contact with one end of the first magnet that is adjacent to the circumference of the rotor core; and a second protrusion provided in close contact with one end of the second magnet that is adjacent to the circumference of the rotor core.

The plate may include: a first plate provided in close contact with one side end of the rotor core in the axial direction (A); and a second plate provided in close contact with the other side end of the rotor core in the axial direction (A).

A second exemplary embodiment of the present invention provides a motor including: a rotor assembly; and a stator provided on one side of the rotor assembly in a radial direction (R), wherein the rotor assembly includes: a shaft; a rotor core having a through-hole which is formed in an axial direction (A) and into which the shaft is inserted; a magnet inserted into an inner space of the rotor core; and a plate provided in close contact with at least one side of the rotor core in the axial direction (A), wherein the plate includes a protrusion formed in a region, which faces a region between the magnet and the circumference of the rotor core, and protruding toward the rotor core.

A third exemplary embodiment of the present invention provides a method for manufacturing a rotor assembly, the method including: preparation operation of preparing a shaft, a rotor core, a magnet, and a plate; assembly operation of i) inserting the shaft into a through-hole formed inside the rotor core, ii) inserting the magnet into an inner space formed inside the rotor core, and iii) bringing the plate into close contact with at least one side end of the rotor core in an axial direction (A); and filling operation of filling a space between the rotor core and the magnet with a resin material having flowability, wherein the plate is provided with a protrusion that protrudes in one direction, wherein during the assembly operation, the plate is disposed such that the protrusion faces the rotor core.

During the assembly operation, the protrusion may be provided in close contact with the at least one side of the magnet.

During the filling operation, the resin material may fill the space so as to come into close contact with the protrusion.

The resin material may be an epoxy resin.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
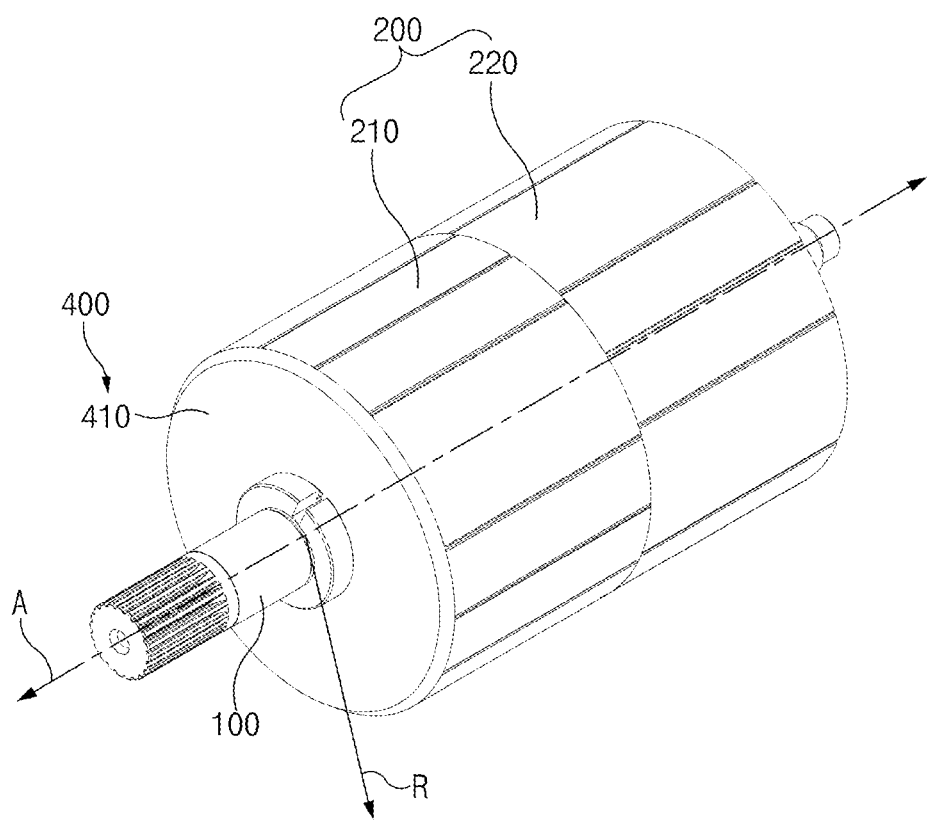
FIG. 1 is a first perspective view illustrating a structure of a rotor assembly according to the present disclosure.
Figure 2:
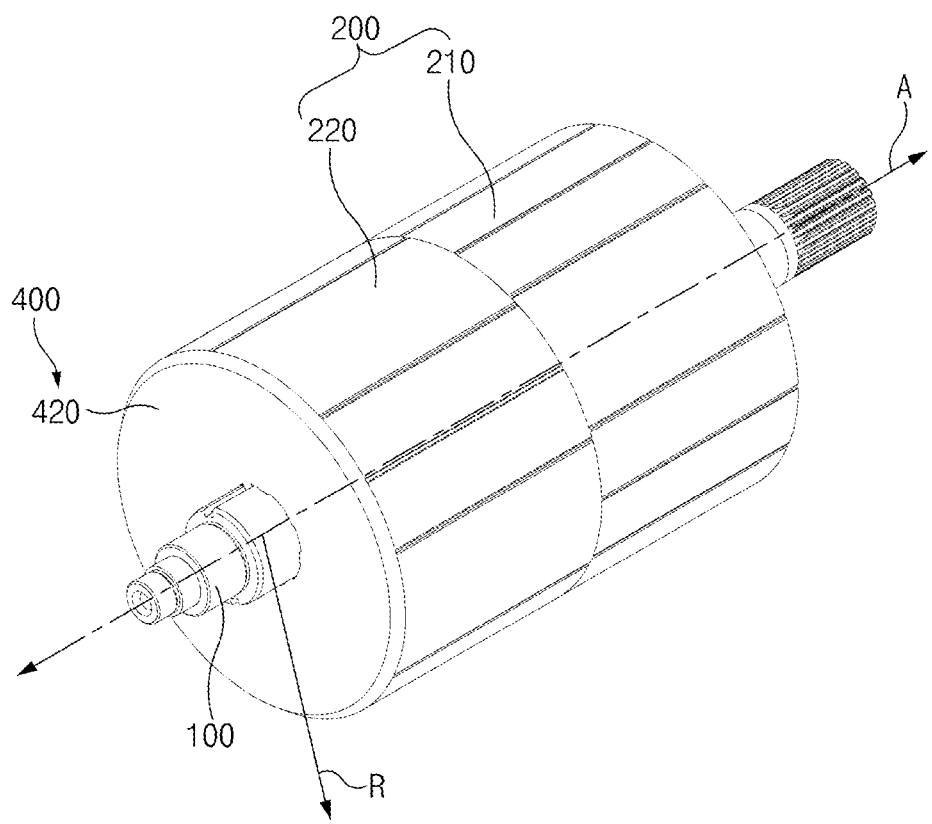
FIG. 2 is a second perspective view illustrating a structure of a rotor assembly according to the present disclosure.
Figure 3:
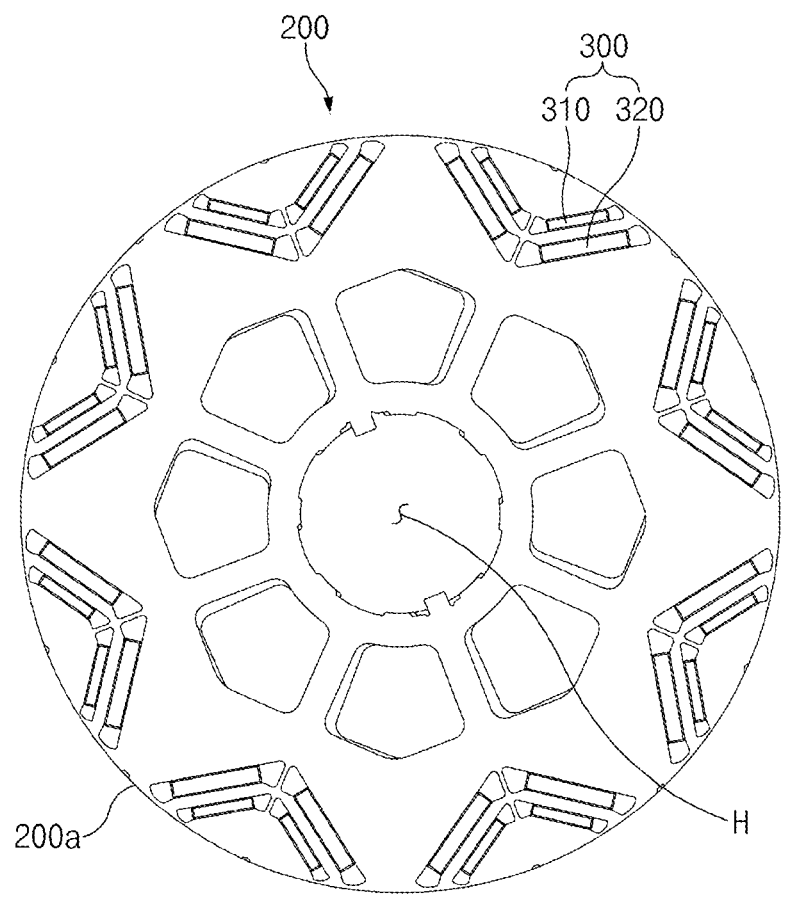
FIG. 3 is a view when a state, in which a rotor core, a magnet, and a plate are coupled to each other in a rotor assembly according to the present disclosure, is viewed in an axial direction.
Figure 4:
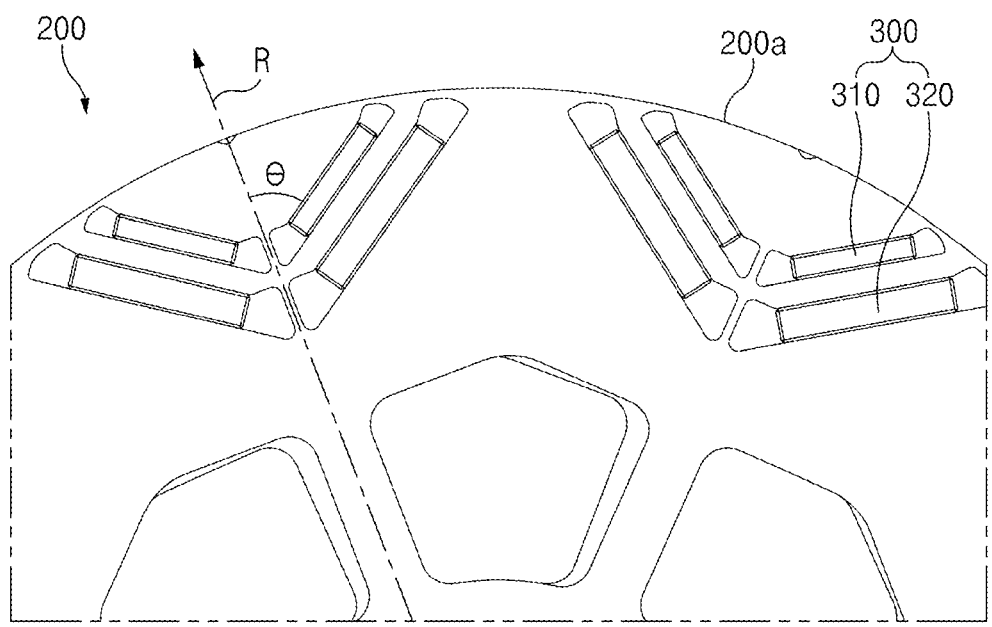
FIG. 4 is an enlarged view illustrating part of FIG. 3.
Figure 5:
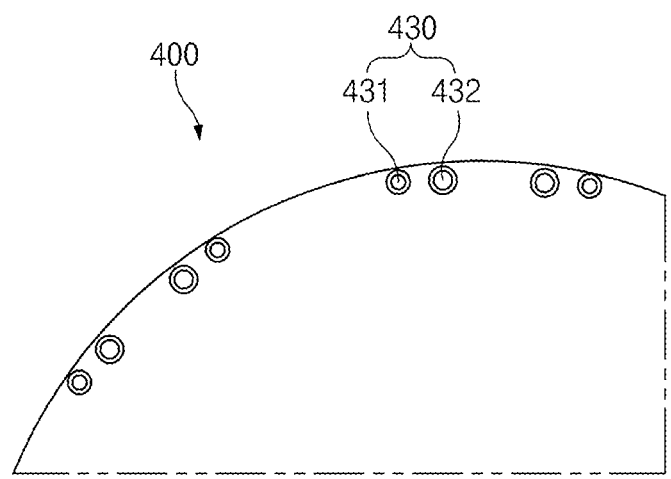
FIG. 5 is an enlarged view illustrating a plate according to the present disclosure.
Figure 6:
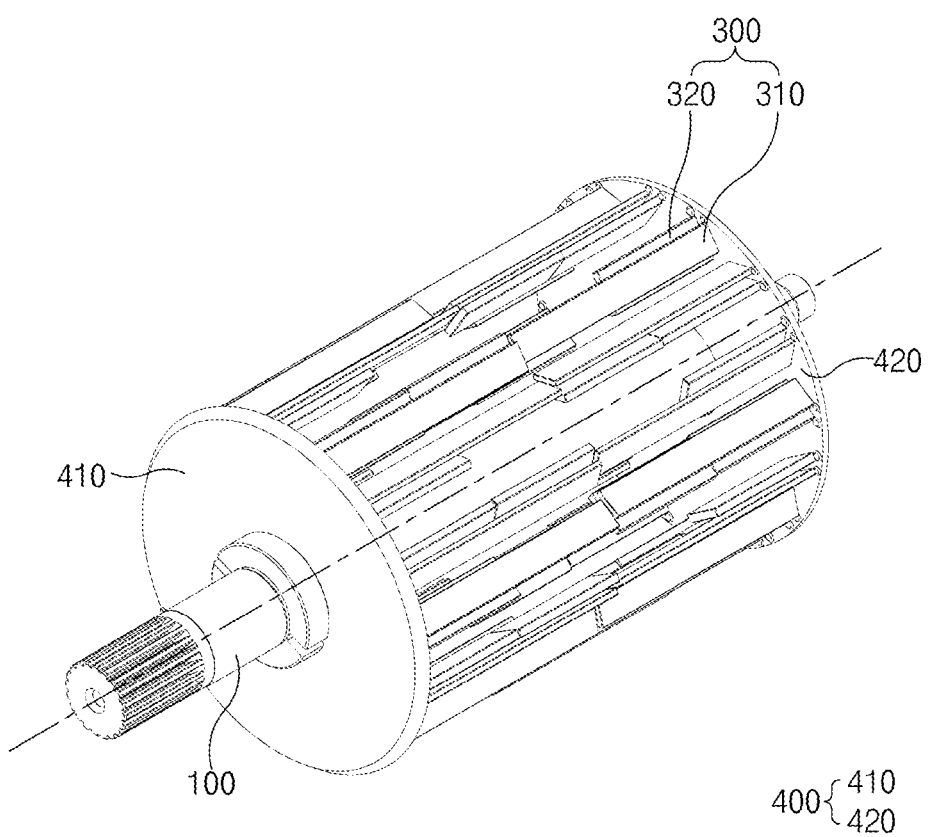
FIG. 6 is a perspective view illustrating a state in which a rotor core is removed from a rotor assembly according to the present disclosure.
Figure 7:
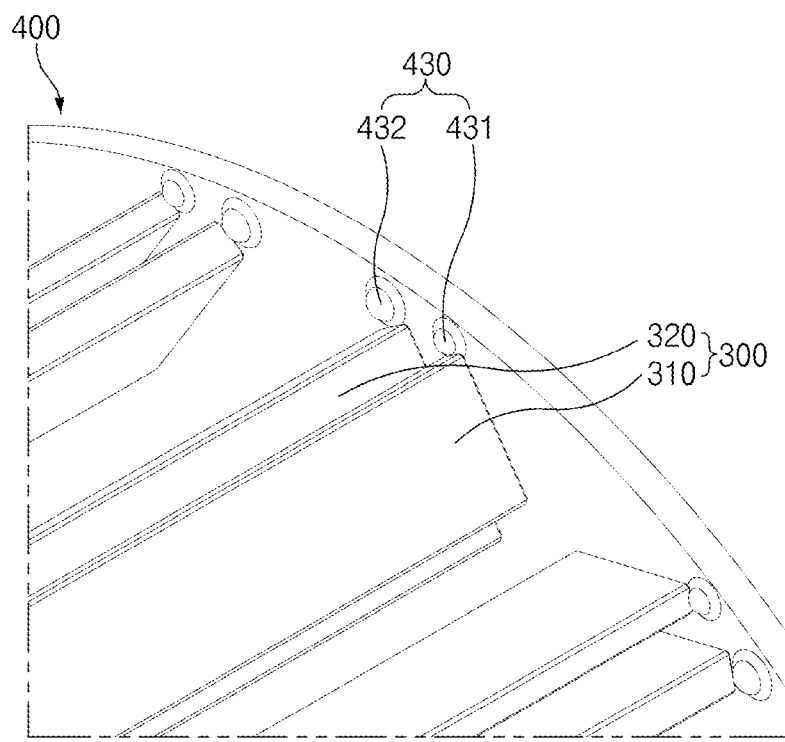
FIG. 7 is an enlarged perspective view illustrating a coupling relationship between a magnet and a plate in a rotor assembly according to the present disclosure.
Figure 8:
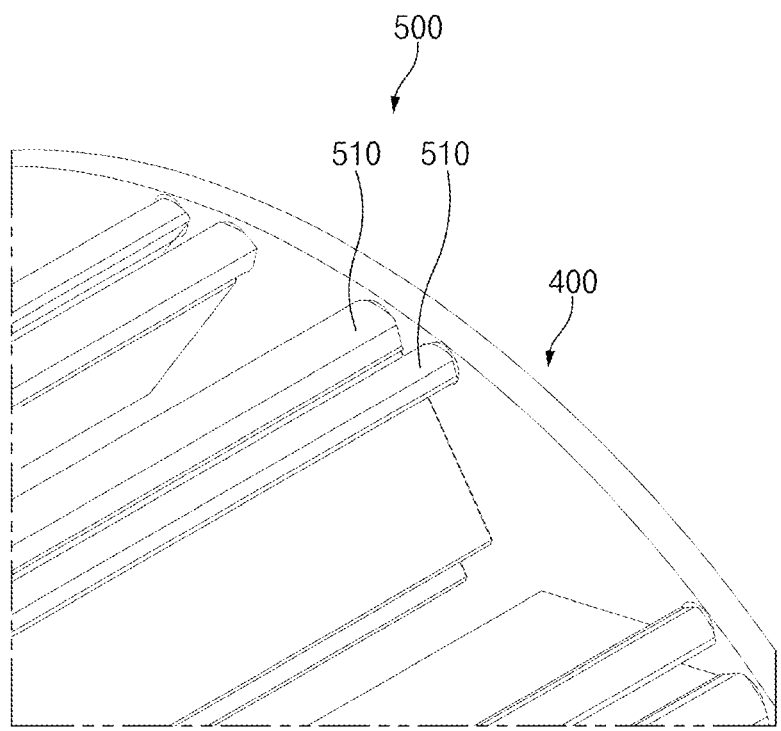
FIG. 8 is an enlarged perspective view illustrating a coupling relationship between a magnet, a plate, and a resin portion in a rotor assembly according to the present disclosure.

Hereinafter, a rotor assembly, a motor, and a method for manufacturing a rotor assembly according to the present disclosure will be described with reference to the drawings.
Rotor Assembly FIG. 1 is a first perspective view illustrating a structure of a rotor assembly according to the present disclosure, and FIG. 2 is a second perspective view illustrating a structure of a rotor assembly according to the present disclosure. FIG. 3 is a view when a state, in which a rotor core, a magnet, and a plate are coupled to each other in a rotor assembly according to the present disclosure, is viewed in an axial direction, and FIG. 4 is an enlarged view illustrating part of FIG. 3. Also, FIG. 5 is an enlarged view illustrating a plate according to the present disclosure, and FIG. 6 is a perspective view illustrating a state in which a rotor core is removed from a rotor assembly according to the present disclosure. FIG. 7 is an enlarged perspective view illustrating a coupling relationship between a magnet and a plate in a rotor assembly according to the present disclosure, and FIG. 8 is an enlarged perspective view illustrating a coupling relationship between a magnet, a plate, and a resin portion in a rotor assembly according to the present disclosure.

Referring to the drawing, a rotor assembly 10 according to the present disclosure may include: a shaft 100; a rotor core 200 having a through-hole H which extends in an axial direction A, wherein the shaft 100 is inserted into the through-hole H; a magnet 300 inserted into an inner space of the rotor core 200 which is formed separately from the through-hole H; and a plate 400 provided in close contact with the rotor core 200 in the axial direction A.

The shaft 100, the rotor core 200, the plate 400 may rotate together because fixed to each other. More preferably, the through-hole H may be formed in the central region of the rotor core 200 in a radial direction R, and the inner space, into which the magnet 300 is inserted, may be spaced apart from the through-hole H in the radial direction R.

Meanwhile, according to the present disclosure, the plate 400 may include a protrusion 430 formed in a region, which faces a region between the magnet 300 and a circumference 200a of the rotor core 200, and protruding toward the rotor core 200. More specifically, referring to FIG. 7, the protrusion 430 may be provided in close contact with the magnet 300.

According to the related art, while the rotor assembly rotates, stress is concentrated on some regions of the rotor assembly. The stress described above is concentrated on a relatively thin region, which is a region between the magnet and the circumference of the rotor core.

In the present disclosure, the plate 400 is provided with the protrusion 430 to cope with the stress concentration described above, and the protrusion 430 supports the magnet 300. Accordingly, some of the stress concentrated on the rotor core according to the related art may be distributed to the protrusion 430. In this case, the rigidity of the rotor assembly 10 in the radial direction R may be increased without increasing the thickness of the region between the magnet 300 and the circumference 200a of the rotor core 200 in the radial direction R.

Meanwhile, when the radial thickness of the region between the magnet and the circumference of the rotor core increases, the amount of leaked magnetic flux, among the amount of the magnetic fluxes formed by the magnet during the rotation of the rotor assembly, increases. Accordingly, the amount of effective magnetic flux decreases, and this causes deterioration in output and torque of the motor.

However, according to the present disclosure, the thickness of the region between the magnet 300 and the circumference 200a of the rotor core 200 in the radial direction R may be minimized by the protrusion 430, and thus, the reduction in amount of effective magnetic flux may be prevented. As a result, the output and torque of the motor may be maximized. Hereinafter, the structure of the rotor assembly 10 according to the present disclosure will be described with reference to the drawings.

Referring to FIGS. 3 and 4, a certain region may be formed between the rotor core 200 and the magnet 300. This may be understood as indicating that a space is formed between the rotor core 200 and the magnet 300.

Here, according to the present disclosure, a resin portion 500 may be further included, which is provided in the certain region described above and bonded to each of the rotor core 200 and the magnet 300. This may be understood as indicating that the space between the rotor core 200 and the magnet 300 is filled with the resin portion 500. More preferably, the protrusion 430 may be provided in close contact with the resin portion 500. Therefore, the protrusion 430 may support not only the magnet 300 but also the resin portion 500. The resin portion 500 may be, for example, an epoxy resin, but the material of the resin portion 500 is not limited thereto.

Meanwhile, as illustrated in FIGS. 3 and 4, the magnet 300 may be provided inside the rotor core 200 at a certain angle θ with respect to the radial direction R perpendicular to the axial direction A. Also, referring to FIGS. 4 to 7, the protrusion 430 may be provided in close contact with one end of the magnet 300 that is adjacent to the circumference 200a of the rotor core 200.

Meanwhile, referring to FIGS. 3, 4, and 8, the resin portion 500 may include a first resin portion 510 bonded to one end of the magnet 300 that is adjacent to the circumference 200a of the rotor core 200. Also, the resin portion 500 may further include a second resin portion (not shown) bonded to the other end of the magnet 300 on the opposite side from the one end. However, the rotor assembly 10 according to the present disclosure may not include the second resin portion. In this case, an empty space, which is not filled with the resin portion 500, may be formed between the magnet 300 and the rotor core 200 at the other end of the magnet 300 on the opposite side from the one end.

Meanwhile, the rotor core 200 may be provided in plurality. In one example, the rotor core 200 may include a first rotor core 210 and a second rotor core 220 provided in close contact with one side end of the first rotor core 210 in the axial direction A. However, unlike the above, the rotor core 200 may not be provided in plurality but may be provided as a single body, or may be divided into three or four sections. In the drawing, the rotor core 200 is illustrated as being divided into two sections as one example.

The plate 400 may be provided in close contact with each of both ends of the rotor core 200 in the axial direction A. More specifically, the plate 400 may include: a first plate 410 provided in close contact with one side end of the rotor core 200 in the axial direction A; and a second plate 420 provided in close contact with the other side end of the rotor core 200 in the axial direction A. As illustrated in the drawing, when the rotor core 200 includes the first rotor core 210 and the second rotor core 220, the first plate 410 may be provided in close contact with one side end of the first rotor core 210 in the axial direction A, and the second plate 420 may be provided in close contact with one side end of the second rotor core 220 in the axial direction A. When one of the first plate 410 and the second plate 420 is a front rotor plate, the other may be a rear rotor plate.

Meanwhile, the magnet 300 may include: a first magnet 310 provided at the certain angle θ with respect to the radial direction R; and a second magnet 320 located parallel to the first magnet 310 and provided further inside the rotor core 200 than the first magnet 310.

Also, the protrusion 430 may include: a first protrusion 431 provided in close contact with one end of the first magnet 310 that is adjacent to the circumference 200a of the rotor core 200; and a second protrusion 432 provided in close contact with one end of the second magnet 320 that is adjacent to the circumference 200a of the rotor core 200. Thus, the first protrusion 431 and the second protrusion 432 may be configured to support the first magnet 310 and the second magnet 320, respectively.

Meanwhile, in one example, each of the first magnet 310 and the second magnet 320 may be provided in plurality. For example, as illustrated in FIGS. 3 and 4, two first magnets 310 may meet each other to form a V shape, and two second magnets 320 may meet each other to form a V shape.

Motor

A motor according to the present disclosure may include: a rotor assembly 10; and a stator provided on one side of the rotor assembly 10 in a radial direction R.

Here, the rotor assembly 10 may include: a shaft 100; a rotor core 200 having a through-hole H which is formed in an axial direction A and into which the shaft 100 is inserted; a magnet 300 inserted into an inner space of the rotor core 200; and a plate 400 provided in close contact with one side of the rotor core 200 in the axial direction A. Also, the plate 400 may include a protrusion 430 formed in a region, which faces a region between the magnet 300 and a circumference 200a of the rotor core 200, and protruding toward the rotor core 200. The above description of the rotor assembly according to the present disclosure may be applied in the same manner to the motor according to the present disclosure, and thus, the details of the rotor assembly provided in the motor according to the present disclosure are replaced with the above description of the rotor assembly according to the present disclosure.

Method for Manufacturing Rotor Assembly

Referring to the drawings, a method for manufacturing a rotor assembly may include: a preparation operation of preparing a shaft 100, a rotor core 200, a magnet 300, and a plate 400; an assembly operation of i) inserting the shaft 100 into a through-hole H formed inside the rotor core 200, ii) inserting the magnet 300 into an inner space formed inside the rotor core 200, and iii) bringing the plate 400 into close contact with one side end of the rotor core 200 in an axial direction A; and a filling operation of filling a space between the rotor core 200 and the magnet 300 with a resin material having flowability.

Here, according to the present disclosure, the plate 400 may be provided with a protrusion 430 that protrudes in one direction. During the assembly operation, the plate 400 may be disposed such that the protrusion 430 faces the rotor core 200. More specifically, during the assembly operation, the protrusion 430 may be provided in close contact with one side of the magnet 300. More preferably, during the assembly operation, the protrusion 430 may be provided in close contact with one end of the magnet 300 that is adjacent to the circumference 200a of the rotor core 200.

Meanwhile, during the filling operation, the resin material may fill the space so as to come into close contact with the protrusion 430, and the resin material may be an epoxy resin. The resin material may become the above-described resin portion 500 after being cured. Meanwhile, the above description of the rotor assembly according to the present disclosure may be applied in the same manner to the method for manufacturing a rotor assembly according to the present disclosure.

According to the present disclosure, provided are a motor and a rotor assembly, which have a new structure that can prevent deterioration in torque and output of the motor while resolving limitations caused by the concentration of stress in a specific region of the rotor core.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A rotor assembly comprising:
   a shaft;
   a rotor core having a through-hole which is formed in an axial direction (A) and into which the shaft is inserted;
   a magnet inserted into an inner space of the rotor core; and
   a plate provided in close contact with at least one side of the rotor core in the axial direction (A),
   wherein the plate comprises a protrusion formed in a region, which faces a region between a side surface of the magnet and the circumference an inner circumferential surface of the rotor core, and protruding toward the rotor core,
   wherein a certain region is formed between the rotor core and the magnet, and the rotor assembly further comprises a resin portion that is provided in the certain region and bonded to the rotor core and the magnet
   wherein the protrusion is provided in close contact with one end of the magnet that is adjacent to the circumference of the rotor core,
   wherein the resin portion comprises a first resin portion bonded to one end of the magnet that is adjacent to the circumference of the rotor core wherein an empty space, which is not filled with the resin portion, is formed between the magnet and the rotor core at the other end of the magnet on the opposite side from the one end.

2. The rotor assembly of claim 1, wherein the protrusion is provided in close contact with the magnet.

3. The rotor assembly of claim 1, wherein the protrusion is provided in close contact with the resin portion.

4. The rotor assembly of claim 2, wherein the magnet is provided inside the rotor core at a certain angle (θ) with respect to a radial direction (R) perpendicular to the axial direction (A), and
the protrusion is provided in close contact with one end of the magnet that is adjacent to the circumference of the rotor core.

5. The rotor assembly of claim 4, wherein the magnet comprises:
a first magnet provided at the certain angle (θ) with respect to the radial direction (R); and
a second magnet located parallel to the first magnet and provided further inside the rotor core than the first magnet,
wherein the protrusion comprises:
a first protrusion provided in close contact with one end of the first magnet that is adjacent to the circumference of the rotor core; and
a second protrusion provided in close contact with one end of the second magnet that is adjacent to the circumference of the rotor core.

6. The rotor assembly of claim 5, wherein the plate comprises:
a first plate provided in close contact with one side end of the rotor core in the axial direction (A); and
a second plate provided in close contact with the other side end of the rotor core in the axial direction (A).

7. A motor comprising:
a rotor assembly; and
a stator provided on one side of the rotor assembly in a radial direction (R),
wherein the rotor assembly comprises:
a shaft;
a rotor core having a through-hole which is formed in an axial direction (A) and into which the shaft is inserted;
a magnet inserted into an inner space of the rotor core; and
a plate provided in close contact with at least one side of the rotor core in the axial direction (A),
wherein the plate comprises a protrusion formed in a region of the plate, which faces a region between a side surface of the magnet and the circumference an inner circumferential surface of the rotor core, and protruding toward the rotor core,
wherein a certain region is formed between the rotor core and the magnet, and the rotor assembly further comprises a resin portion that is provided in the certain region and bonded to the rotor core and the magnet
wherein the protrusion is provided in close contact with one end of the magnet that is adjacent to the circumference of the rotor core,
wherein the resin portion comprises a first resin portion bonded to one end of the magnet that is adjacent to the circumference of the rotor core
wherein an empty space, which is not filled with the resin portion, is formed between the magnet and the rotor core at the other end of the magnet on the opposite side from the one end.

* * * * *